United States Patent [19]

Tramposch et al.

[11] Patent Number: 4,485,881
[45] Date of Patent: Dec. 4, 1984

[54] SHIFT ADJUSTMENT FOR A LOAD CELL

[75] Inventors: Herbert Tramposch, Riverside; Glen J. Randmer, Norwalk; Walter E. Miller, Milford, all of Conn.

[73] Assignee: Pitney Bowes Inc., Stamford, Conn.

[21] Appl. No.: 530,556

[22] Filed: Sep. 9, 1983

[51] Int. Cl.³ .......................... G01G 3/14; G01G 3/08; G01G 21/08
[52] U.S. Cl. ................................. 177/211; 177/229; 177/260; 73/862.65
[58] Field of Search ............... 177/164, 211, 260, 229; 73/862.64, 862.65, 862.66

[56] References Cited

U.S. PATENT DOCUMENTS 3,490,554  1/1970  Schellentroger ............... 177/211 X
4,170,270 10/1979  Sette et al. ........................ 177/229 X

FOREIGN PATENT DOCUMENTS 2902061  9/1979  Fed. Rep. of Germany ...... 177/229
 563583  6/1977  U.S.S.R. ............................ 73/862.65

Primary Examiner—E. A. Goldberg
Assistant Examiner—Patrick W. Foster
Attorney, Agent, or Firm—Melvin J. Scolnick; Albert W. Scribner; William D. Soltow, Jr.

[57] ABSTRACT

A load cell for measuring forces applied thereto including an adjusting mechanism for off center load adjustment is disclosed. The load cell comprises a substantially parallelogram structure having a moving section on one side and a fixed section on the opposite side. Upper and lower strips extend between and connect the fixed and moving sections. Flexjoints are located at approximately the juncture of each of the strips and the sections, the flexjoints being adapted to flex in response to the force exerted thereon and facilitate transmission of the force to the transducer portion of the load cell. An adjusting mechanism for off center load adjustment is positioned on the load cell and includes both a vertical and horizontal adjusting mechanism that are adapted to alter the position of a first flexjoint adjacent to the adjusting mechanism relative to the position of a second flexjoint.

23 Claims, 5 Drawing Figures

SHIFT ADJUSTMENT FOR A LOAD CELL

BACKGROUND OF THE INVENTION

I. Field of the Invention

This invention relates generally to a device referred to as a load cell used for measuring a force by means of a strain gage which device is typically used in a scale, and more specifically, to a load cell having a means for adjusting for weight shift or off center load adjustment.

II. Description of the Prior Art

There are many environments in which load cells are used for the purpose of determining forces applied to an object. One such environment is a weighing scale, such as a postal scale, wherein the strain of a load cell is measured to determine the weight of an object that is placed on a load support. An example of such a weighing scale that uses load cells may be found in U.S. Pat. No. 4,037,675.

It is known in the art to use in a scale a load cell of the parallelogram type. This type of structure was the outgrowth of a need for improved measuring techniques previously offered by mechanical scales that functioned by the use of beams on knife edges. These mechanical scales also utilized balancing forces with known weights or deflecting coil springs. The scales utilizing weight balancing techniques were accurate, but very cumbersome to use, while the spring scales did not have the desired accuracy for near precision type measurements.

Furthermore, because most of today's enterprises require the use of computers, it became desirable to have the weight of an object indicated in electrical or digital form. This digital readout was then utilized for data processing such as in the calculation of postage due on items mailed for various mailing zones. Since known mechanical scales could not provide these needs, the development of load cell technology has aided to fill this void.

Many known designs for load cells are in the form of a parallelogram type load transmitting structure. See, for example, U.S. Pat. Nos. 4,181,011 and 4,196,784. However, various problems have been encountered when using this type of structure in a scale. For example, some of these structures are relatively expensive to manufacture. In some, internal forces caused by the method of production or by fabrication and temperature gradients have affected their accuracy. The optimum performance of the load cell in many instances was also thwarted by inherent forces that were difficult to compensate for. In addition, the accuracy is effected to a large degree by the position that the weight to be measured is placed on the weighing pan of the scale. Although load cells have been successfully utilized in many commercial scale applications, there remains a real need in scales which employ a load cell for a device, that in addition to resolving many of the above-mentioned disadvantages, can easily correct or compensate the load cell for extraneous forces from weight placement deviations from a central loaded condition. Examples of other typical load cells are disclosed in U.S. Pat. Nos. 4,037,675, 4,103,545 and 4,170,270.

SUMMARY OF THE INVENTION

It is therefore an object of the present invention to provide a load cell devoid of the above noted disadvantages.

Another object of the present invention is to provide a load cell that is very accurate and comparatively economical to manufacture.

Still another object of the present invention is to provide a load cell for use in a scale that will accurately sense a force irrespective of the location of the load on the scales weighing pan.

Still another further object of the present invention is to provide a load cell having a novel means for off center load adjustment.

A further object of the present invention is to provide a novel load cell that offers low cost of fabrication and is torsionally stiff around any structural axis, The foregoing objects and others are accomplished in accordance with the present invention by providing a load cell for measuring forces applied thereto including an adjusting means for off center load adjustment comprising a substantially parallelogram load cell structure having a moving section on one side and a fixed section on the opposite side. Upper and lower strips extend between and connect the sections. Flexjoints are located at approximately the juncture of each of the strips and the sections, the flexjoints being adapted to flex in response to or proportion to the force exerted thereon and facilitate transmission of the force to strain gages positioned on the load cell. An adjusting means is positioned on the load cell and includes both a vertical and horizontal adjusting mechanism that are adapted to alter the position of one flexjoint relative to another flexjoint.

The load cell comprises both a fixed and a movable portion. The center of gravity of the load can be located anywhere in a platform attached to the load cell's moving portion and the signal generated by the weighing element should remain substantially unaffected by shifting the load on the platform. To provide this feature there is positioned within the fixed end of the load cell in accordance with the present invention an adjustment means adapted to regulate offset weight deviations from a central loaded condition.

The load cell of this invention is milled from a solid piece of metal, preferably aluminum, that will incorporate the strain gage bridge configuration and loading fixture in a one piece assembly. The structure is in the form of a parallelogram having on one side a moving portion and on the opposite side a fixed portion. Extending between and connecting these two portions are two strips, one extending horizontally across the top and the other extending horizontally across the bottom, this forming the parallelogram structure. Below the top or upper strip is an extending bar connected on one end to the moving portion of the structure. Above the lower strip is a horizontally extending bar connected on one end to the fixed portion of the structure which is essentially the sensing beam. Located immediately below the top strip and adjacent to the flexjoint in the fixed portion is an opening or slot into which the adjusting means of this invention is located. Located on the sensing beam portion above the lower strip is the transducer or strain gage location of this weighing element. In each corner of the upper and lower strips is located a hinge zone or flexjoint that provides the resiliency needed for structures of this nature.

In manufacturing the weighing element of this invention, it was found that structural dimensional variations of even only ± one thousandth of an inch, due to machining errors in the vertical dimensions of the distances between two flexjoints, was sufficient to consume the major part of the weight shift error tolerance. Similar effects were noticed by tolerance variations in flexjoint thickness. If, in addition, dimensional variations are also introduced across the width of the flexjoint, especially when for torsional stiffness reasons the width dimension is large, the weight shift errors could become excessive for the intended use. It has been determined that by moving one of the four flexjoints in the generally vertical direction (up or down) a specified amount, the weight shift error can be adjusted to an essentially negligible value. The adjustment means incorporated into the structure of the weighing device of this invention accomplishes this compensation. The shift adjustment means of this invention is easy to operate and provides a means to obtain a very precise result. The adjustment means as noted earlier alters the structure of the load cell or the parallelogram geometry. With this substantial symmetry accomplished, very accurate measurements can be obtained.

The adjusting means that is preferred in accordance with the present invention is one that provides both a vertical and horizontal adjusting mechanism adapted to alter the position of the adjacent upper flexjoint of the load cell structure relative to the lower flexjoint. Specifically, there is provided two wedges located in the opening below and adjacent to the top or upper strip of the load cell. The wedges are tapered so that when adjustment screws attached thereto are tightened, they provide lift to the structure. Located vertically between the wedges is a preload screw. This screw will provide two effects: (1) it can be used to regulate preload and total wedge lift and (2) it acts as a pivot to balance shift positions. These adjustment means allow substantially precise balancing of the load cell of this invention.

BRIEF DESCRIPTION OF THE DRAWINGS

For a better understanding of the invention as well as other objects and further features thereof, reference is made to the following detailed disclosure of this invention taken in conjunction with the accompanying drawings wherein.

DESCRIPTION OF THE PREFERRED EMBODIMENTS

Figure 1:
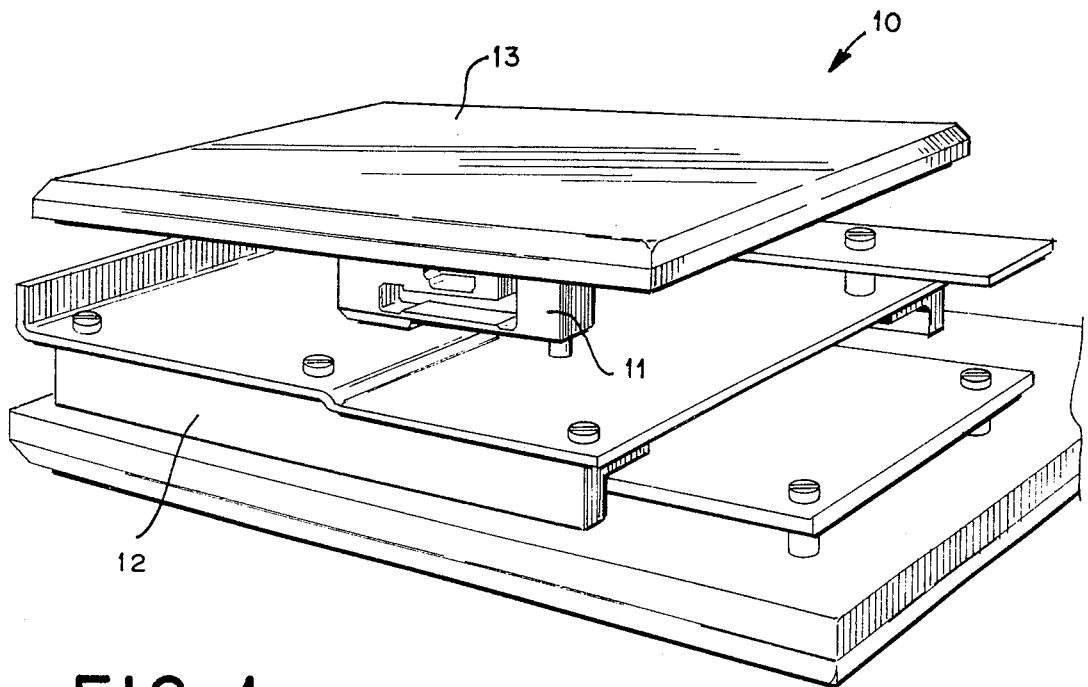
FIG. 1 is a perspective view of a scale incorporating a load cell in accordance with the present invention.

A weighing scale that employs a load cell in accordance with the present invention is shown in FIG. 1 generally as 10. Broadly speaking, the weighing scale includes a load cell 11 that is fixed at one end portion thereof to base member 12. Secured to the opposite end and moving portion of load cell structure 11 is weighing pan 13 that is adapted to receive a load that would cause a force to be transmitted through the load cell to a transducer (strain gages) in the manner as described hereinbelow.

Figure 2:
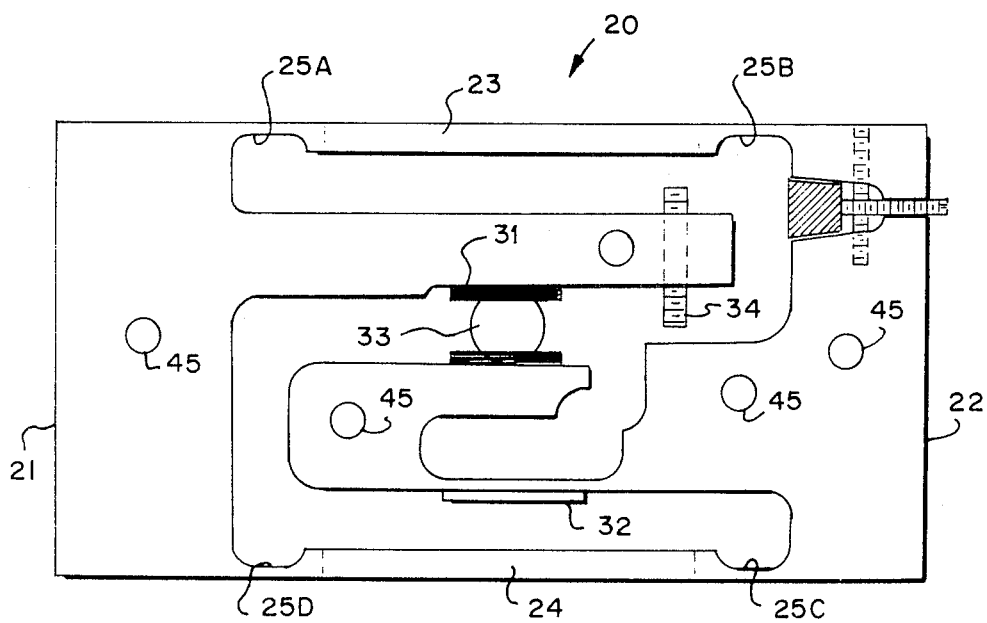
FIG. 2 is a front plan view partly in section, of the load cell in accordance with this invention.
Figure 3:
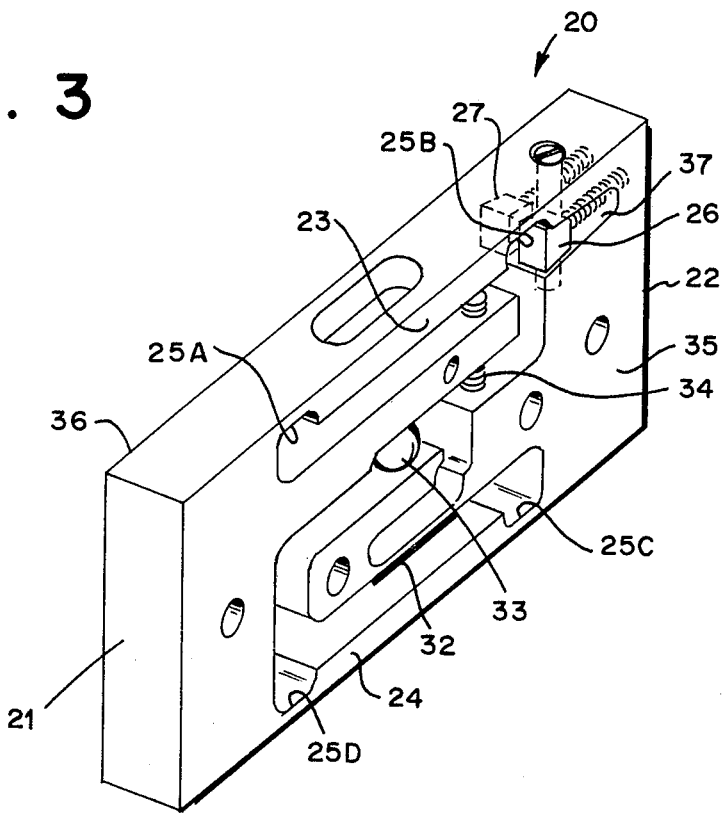
FIG. 3 is a perspective view of the load cell of FIG. 2.

In FIGS. 2 and 3 there is illustrated a single unit load sensing device 20 having a parallelogram structure comprising a moving section 21 on one side thereof and a fixed section 22 located opposite side. Extending between and connecting the fixed and moving sections are upper and lower strips 23 and 24, respectively. Located at approximately 21 and 22 are flexjoints 25A, 25B, 25C and 25D adapted to flex in approximate proportion to the force exerted on the load cell 20.

Figure 4:
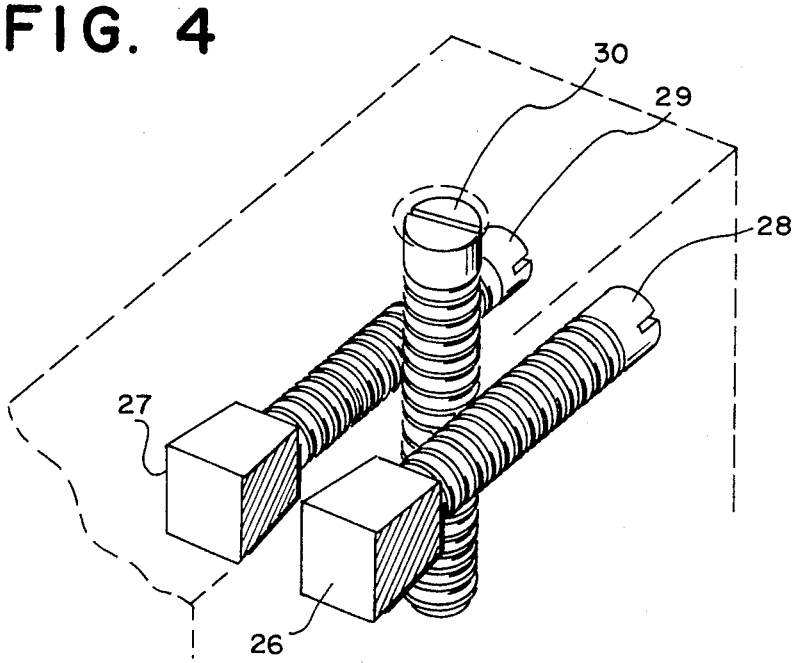
FIG. 4 is an enlarged perspective view of the adjustment mechanism of this invention.

In accordance with the present invention and as illustrated in FIGS. 3 and 4, load cell 20 includes an adjusting means to allow the user of a scale incorporating the load cell to adjust and compensate for a load (weight) that is placed off center on the scales weighing pan thereby adjusting (correcting) for the inherent inaccuracies existing in the geometry of the load cell. The adjustment means is positioned on load cell 20 and includes both a vertical and horizontal adjusting mechanism that is adapted to alter the position of upper flexjoint 25B relative to lower flexjoint 25C. The horizontal mechanism preferably includes a wedge type system that is not integral with the remainder of the load cell 20, but is movable therein. This system preferably comprises two separate wedges 26 and 27 that are each movable, attached and adjustable within the load cell by screw members 28 and 29. Screws 28 and 29 are used to adjust wedges 26 and 27 to minimize any deviation in the symmetry of load cell 20 caused by the machining or manufacturing process used to produce the load cell. Working together with the horizontal mechanism to adjust the geometry of the load cell and thereby provide more accurate weight measurements, is a vertical adjusting mechanism that preferably comprises a screw member 30 referred to as a preload screw. The combined vertical and horizontal adjusting mechanism can also correct or compensate for any other outside interfering forces that may inhibit correct weight measurement when using load cell 20.

In the operation of a scale employing a load cell in accordance with the invention, such as for example postal scale, weight is placed on the scale's weight pan and a force is thereby introduced on the moving end 21 of a load cell 20. This force is transferred through hardened steel members 31 to the transducer portion of the load cell that includes a strain gages 32. The members 31 are employed to allow for relative motion between the various portions of the parallelogram structure and at the same time keep friction at acceptable levels. The steel ball 33 assures rolling friction which is several orders of magnitude smaller than sliding friction. A protective overload stop 34 is provided inside the structure and an alternative overload stop can be activated if desired between the structure and a base. The load cell comprises an upper strip 23 and a lower strip 24 each connecting the fixed portion 22 and the moving portion 21 at their upper and lower portions. At both ends of strips 23 and 24 are located flexjoints or hinge zones. These hinge zones or flexjoints 25A, 25B, 25C and 25D permit the degree of resiliency that the load cell requires to convey the force of the weight being measured through the structure to the transducer section and the strain gages 32. Load cell 20 includes a front or face portion 35 and a rear or back portion 36 (not specifically shown).

Located in opening 37 is the adjusting means in accordance with the present invention which comprises (i) two wedges 26 and 27, each wedge being connected in movable relationship to wedge adjustment screws 28 and 29 and (ii) as shown in the top portion of the load cell, preload screw 30. A principal reason for having the horizontal and vertical adjustment means in accordance with the present invention is so that when a weight is placed in a position other than the center position of a scale's weighing pan, that resolved weight will be within an acceptable tolerance margin of the reading as compared to the situation where the same weight is placed in the center position of the pan.

In making the off center weight adjustments using the adjusting means of this invention, the following technique is preferably employed: In view of the mechanical advantage of using a combined wedge and screw type of adjusting means as opposed to the use of a screw mechanism alone, preload screw 30 is preferably adjusted first. Therefore, with wedges 26 and 27 not being in position within area 37, i.e. not exerting any lift force on the load cell structure, the preload screw is turned to put tension thereon and thereby cause the measurable distance between the bottom portion of flexjoint 25C and the top portion of flexjoint 25B to decrease.

Figure 5:
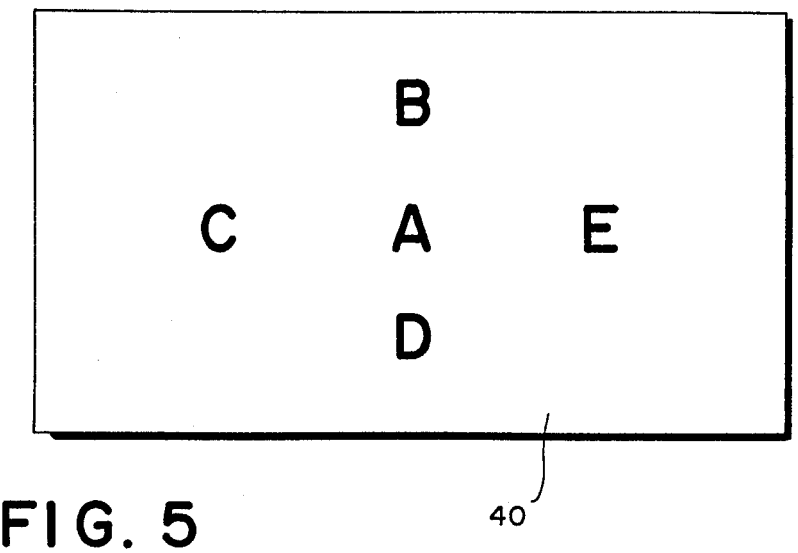
FIG. 5 is a top plan view of a scales weighing pan illustrating different off center weighing positions.

There is shown in FIG. 5 a scale weighing pan 40 with five positions indicated thereon (A, B, C, D and E) for placing a known weight for the purpose of making off center weight adjustment. Position A represents the center position. By adjusting either the preload screw 30, or either of wedges 26 or 27, or both the preload screw and the wedges with a known weight on center position A, the output weight reading will remain substantially constant. As the preload screw is adjusted as stated above (no lift force exerted by the wedges), a weight placed over position C will show an increase in its readout value as tension is put on the screw (measurable distance between flexjoints 25C and 25B decreases), a weight over position E will show a decrease in its readout value and a weight over either of positions B or D will show no change in the readout values as the preload screw is placed under tension. The greater the tension placed on the preload screw (the larger the decrease in the measurable distance between the bottom portion of flexjoint 25C and the top portion of flexjoint 25B), and therefore the larger the increase in the readout of the weight measurement for a weight placed over position C and the larger the decrease in the readout of the weight measurement for a weight placed over position E.

Thereafter, both of the wedges 26 and 27 are brought into positive contact with the load cell structure using screws 28 and 29. As more tension is placed on screw 29 and thereby a lift effect is caused by wedge 27, the measurable distance between that portion of the bottom of flexjoint 25C juxtapositioned toward the front face portion 35 of the load cell and that portion of the top of flexjoint 25B juxtapositioned toward the front face of the load cell, will increase. Increasing the distance between flexjoints 25C and 25B in this manner will cause the readout value of a weight located on position B to increase; on position C to decrease; on position D to decrease; and on position E to increase. As more tension is placed on screw 28 and thereby a lift effect is caused by wedge 26, the measurable distance between that portion of the bottom of flexjoint 25C juxtapositioned toward the back or rear face portion 36 of the load cell and that portion of the top of flexjoint 25B juxtapositioned toward the rear face of the load cell, will increase. Increasing the distance between flexjoints 25C and 25B in this second manner will cause the readout value of a weight placed on position B to decrease; on position C to decrease; on position D to increase; and on position E to increase.

As more tension is placed on both screws 28 and 29 simultaneously, thereby causing a lift effect by both wedges 26 and 27, the measurable distance between the entire bottom of flexjoint 25C and the entire top of flexjoint 25B, will increase. Increasing the distance between flexjoints 25C and 25B in this third manner (by simultaneously moving both wedges) will cause the readout value of a weight placed on position B to remain substantially constant; on position C to decrease; on position D to remain substantially constant; and on position E to increase.

The transducer is an integral part of the load cell structure, and its geometry must be chosen in such a way to satisfy two requirements: (1) to yield maximum strain at the location of the strain gages and (2) to provide sufficient vertical stiffness to the entire structure. In FIG. 2, the location of the strain gages 32 are arranged in a double symmetrical pattern. An access window is preferably provided at the bottom portion of the weighing structure so that the strain gages can be viewed. In accordance with the present invention any suitable type of strain gage may be used. It is not necessary that a double set of strain gage pads be used, any single pad or printed circuit type gage may be used, if suitable.

The adjusting means in accordance with the present invention assures that ways to correct for inherent inaccuracies in the manufactured load cell are provided for. Preload screw 30 would be used when it is desired to adjust when one flexjoint is higher or lower than the flexjoint opposite to it. The wedge adjustment system would be used when it is desired to accomplish with the preload screw a balanced condition.

While aluminum is the preferred material for use in the manufacture of the weighing element (load cell) of this invention, other materials such as beryllium copper, stainless steel, and various other metals and any suitable synthetic material, may be used. Tooling holes 45 are used during the machining and manufacturing process and are desirable because they facilitate making a true parallelogram structure. In a true parallelogram, all sides are parallel to the opposite peripheral sides. It is a quadrilateral structure having both pairs of opposite sides parallel to each other.

We claim:

1. A load cell for measuring forces applied thereto including an adjusting means for off center load adjustment comprising a substantially parallelogram structure having a moving section on one side and a fixed section on the opposite side; upper and lower strips extending between and connecting said sections; flexjoints located at approximately the juncture of each of said strips and said sections, said flexjoints adapted to flex in response to the force exerted thereon and facilitate transmission of the force to a transducer positioned on said load cell; and an adjusting means for off center load adjustment positioned on said load cell and including both a vertical and horizontal adjusting mechanism that are adapted to alter the position of a first flexjoint located adjacent the adjusting mechanism relative to the position of a second flexjoint.

2. The load cell of claim 1 wherein said transducer is integral therewith and positioned intermediate said upper and said lower strips.

3. The load cell of claim 1 wherein said transducer is integral with said fixed section.

4. The load cell of claim 1 wherein said transducer is in force transmitting contact with said moving section.

5. The load cell of claim 1 wherein said adjusting means comprises at least one wedge having at least one surface in contact with a portion of said load cell that is in adjustable proximity with at least one flexjoint.

6. A load cell for measuring forces applied thereto including an adjusting means for off center load adjustment comprising a substantially parallelogram structure having a moving section on one side and a fixed section on the opposite side; upper and lower strips extending between and connecting said sections; flexjoints located at approximately the juncture of each of said strips and said sections, the flexjoints adapted to flex in response to the force exerted thereon and facilitate transmission of the force to a transducer positioned on said load cell, the distance between the flexjoints located along said fixed section being adjustable; and an adjusting means positioned on said load cell and adapted to adjust for a deviation from the substantially parallel relationship between said strips, the adjusting means including both a vertical and horizontal adjusting mechanism positioned to change the distance between the flexjoints located along said fixed section.

7. The load cell of claim 6 wherein said vertical adjusting mechanism and horizontal adjusting mechanism are adjacent at least one of said flexjoints.

8. The load cell of claim 6 wherein said adjusting means are located in an opening adjacent at least one flexjoint.

9. The load cell of claim 6 wherein said adjusting means comprises at least one wedge having at least one surface in contact with a portion of said weighing device that is in adjustable proximity with at least one flexjoint.

10. The load cell of claim 6 wherein said horizontal adjusting mechanism comprises a pair of horizontally movable wedges having adjusting screws attached thereto and said vertical adjusting mechanism comprises a preload screw extending vertically between the two wedges and in adjustable contact with at least one flexjoint.

11. The load cell of claim 10 wherein said adjusting means is located in one corner section of said parallelogram structure and further wherein each of said wedges are adapted to independently exert an upward force on said upper strip and wherein said preload screw is adapted to exert a downward force on said upward strip.

12. The load cell of claim 11 wherein said movable section has in contact therewith an overload stop adapted to limit the load pressure exerted upon said transducer portion.

13. A load cell comprising a one piece substantially parallelogram structure having integral therewith, a moving section on one side and a fixed section on the opposite side; extending longitudinally from each of said sections are upper and lower strips which together with the outer peripheral sides of said sections form the substantially parallelogram structure; flexjoints located at approximately the juncture of each of said strips and said sections being adapted to flex in response to the force exerted thereon, said flexjoints adapted to be deflected in a manner that facilitates transmission of said force to a transducer portion in communication therewith said transducer portion positioned between said upper and said lower strips and in force transmission contact with said moving section; an adjusting means movably connected to said load cell and adapted to adjust said load cell for deviations from offset loading, said adjusting means including both a vertical adjusting mechanism and a horizontal adjusting mechanism, both of said mechanisms being adjacent at least one of said flexjoints.

14. The load cell of claim 13 wherein said adjusting means are located in an opening adjacent at least one flexjoint and are adapted to alter the vertical (height) of the nearest peripheral portion of said parallelogram structure.

15. The load cell of claim 14 wherein said adjusting means comprises at least one wedge having at least one surface contact with a portion of said weighing device that is in adjustable proximity with at least one flexjoint.

16. The load cell of claim 15 wherein said horizontal adjusting mechanism comprises a pair of horizontally movable wedges having adjusting screws attached thereto and said vertical adjusting mechanism comprises a preload screw extending vertically between the two wedges and in adjustable contact with at least one flexjoint.

17. The load cell of claim 16 wherein said adjusting means is located in one corner section of said parallelogram structure and wherein each of said wedges are adapted to independently exert an upward force on said upper strip and wherein said preload screw is adapted to exert a downward force on said upper strip.

18. The load cell in claim 17 wherein said movable section has in contact therewith an overload stop adapted to limt the load pressure exerted upon said transducer portion.

19. A weighing scale including a load cell having an adjusting means for off center load adjustment comprising a base member; a weighing pan for supporting the weight to be measured; and a load cell connected to both the base member and the weighing pan, the load cell including a substantially parallelogram structure having a moving section on one side and a fixed section on the opposite side; upper and lower strips extending between and connecting said sections; flexjoints located at approximately the juncture of each of said strips and said sections, said flexjoints adapted to flex in response to the force exerted thereon and facilitate transmission of the force to a transducer positioned on said load cell; and an adjusting means for off center load adjustment positioned on said load cell and including both a vertical and horizontal adjusting mechanism that are adapted to alter the position of a first flexjoint located adjacent the adjusting mechanism relative to the position of a second flexjoint.

20. The scale of claim 19 wherein said adjusting means comprises at least one wedge having at least one surface in contact with a portion of said load cell that is in adjustable proximity with at least one flexjoint.

21. The scale of claim 19 wherein said horizontal adjusting mechanism comprises a pair horizontally movable wedges having adjusting screws attached thereto and said vertical adjusting mechanism comprises a preload screw extending vertically between the two wedges and in adjustable contact with at least one flexjoint.

22. The scale of claim 21 wherein said adjusting means is located in one corner section of said parallelogram and wherein each of said wedges are adapted to independently exert an upward force on said upper strip and wherein said preload screw is adapted to exert a downward force on said upper strip.

23. The scale of claim 22 wherein said movable section has in contact therewith an overload stop adapted to limit the load pressure exerted upon said transducer portion.

* * * * *